United States Patent [19]

Mizunoe

[11] Patent Number: 4,785,438
[45] Date of Patent: Nov. 15, 1988

[54] MAGNETO-OPTICAL DISC REPRODUCING APPARATUS WITH IMPROVED TWO-PART HEAD

[75] Inventor: Katsumi Mizunoe, Yokohama, Japan

[73] Assignee: Nikon Corporation, Tokyo, Japan

[21] Appl. No.: 814,438

[22] Filed: Dec. 30, 1985

[30] Foreign Application Priority Data

Jan. 9, 1985 [JP] Japan .................................. 60-01794

[51] Int. Cl.$^4$ ...................... G11B 7/095; G11B 13/04; G11B 11/00
[52] U.S. Cl. ...................................... 369/13; 369/110; 369/44; 360/114; 365/122
[58] Field of Search ........................ 369/13, 18, 46, 44, 369/45, 110, 111; 360/114, 59; 365/122

[56] References Cited

U.S. PATENT DOCUMENTS

| | | | |
|---|---|---|---|
| 3,842,197 | 10/1974 | Broussaud et al. | 369/111 |
| 4,198,657 | 4/1980 | Kanamaru | 369/111 |
| 4,410,277 | 10/1983 | Yamamoto et al. | 360/114 |
| 4,472,748 | 9/1984 | Kato et al. | 360/114 |
| 4,507,763 | 3/1985 | Kato | 369/46 |
| 4,510,544 | 4/1985 | Lazzari | 369/13 |
| 4,546,460 | 10/1985 | Ando | 369/46 |
| 4,599,714 | 7/1986 | Endo | 369/13 |

FOREIGN PATENT DOCUMENTS 52444 9/1982 Japan .

OTHER PUBLICATIONS

Jenkins et al, "Fundamentals of Optics", Fourth Edition, published 1976, pp. 564–569.

Primary Examiner—Raymond F. Cardillo
Assistant Examiner—Hoa T. Nguyen
Attorney, Agent, or Firm—Shapiro and Shapiro

[57] ABSTRACT

A reproducing apparatus for magneto-optical discs has a moving head portion and a fixed head portion. Light reflected from the disc is divided into two parallel light beam components having different planes of polarization. These light beam components are transmitted to corresponding light intensity detectors of the fixed head portion. The outputs of the detectors are unaffected by movement of the movable head portion relative to the fixed head portion radially of the disc and are unaffected by movement of the movable head portion in other directions due to inaccuracies in the slider mechanism that moves the movable head portion radially.

10 Claims, 2 Drawing Sheets

MAGNETO-OPTICAL DISC REPRODUCING APPARATUS WITH IMPROVED TWO-PART HEAD

BACKGROUND OF THE INVENTION

1. Field of the Invention

This invention relates to magneto-optical disc apparatus utilizing the Kerr effect or the Faraday effect, for example, and is more particularly concerned with reproducing apparatus employing an improved head that includes a fixed head portion and a movable head portion.

2. Description of the Prior Art

In Japanese Laid-Open Patent Application No. 52444/1984 a reproducing head of a recording-reproducing apparatus of the magneto-optical disc type (hereinafter referred to generally as a "disc") is proposed, in which the head has a movable portion and a fixed portion. The movable head portion has a control system comprising an objective lens movable radially of the disc, a mirror, a focusing system, a tracking system, and a light source unit. The fixed head portion has an analyzer for receiving light reflected from the disc, an imaging optical system, and a photoelectric converting element. Transmission of signals between the two head portions is effected by parallel light beams.

The apparatus of the aforesaid Japanese patent application is advantageous in that the movable head portion is simple and lightweight and in that the apparatus is compact, provides improved efficiency of utilization of the light, and permits high-speed access. However, these advantages are offset somewhat by the need for providing a high accuracy slider mechanism for the movable head portion, which tends to increase the bulkiness and the cost of the apparatus. Such a slider mechanism is required because when the movable head portion moves radially of the disc, movements other than radial movement cause the plane of polarization of the light entering the analyzer to rotate undesirably, resulting in an error in the reproduction of the information recorded on the disc.

SUMMARY OF THE INVENTION

It is an object of the present invention to provide a reproducing apparatus for a disc that retains the advantages of the apparatus of the aforesaid Japanese patent application but avoids the disadvantages of that apparatus.

DESCRIPTION OF THE PREFERRED EMBODIMENTS

Figure 1:
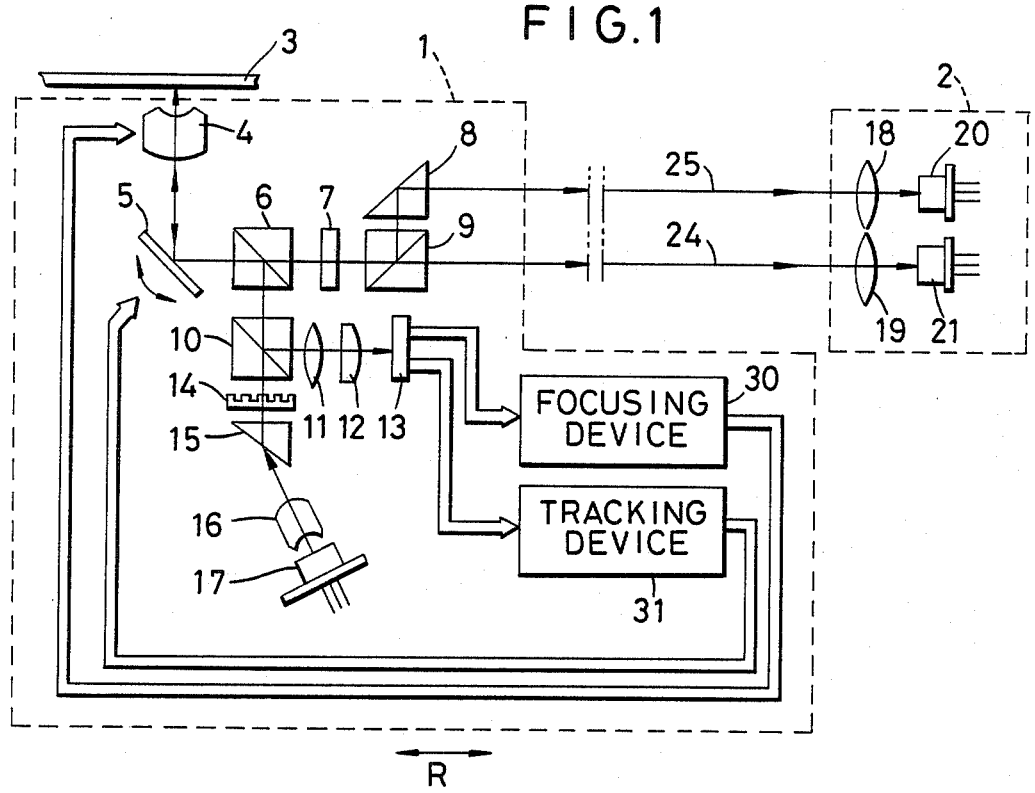
FIG. 1 is a schematic diagram showing a first embodiment of the present invention.

Referring to FIG. 1, apparatus in accordance with a first embodiment of the invention comprises a movable head portion 1 and a fixed head portion 2, the movable head portion being shown adjacent to a disc 3. U.S. Application Ser. No. 720,186, filed Apr. 5, 1985, discloses examples of the construction of a magneto-optical disc which may be employed in the invention. A suitable disc may, for example, have a plurality of convex tracks formed concentrically on the surface of the disc, the magnetic recording may be effected on the convex tracks by the Kerr effect. The movable head portion, which moves relative to the disc and the fixed head portion, includes an objective lens 4, a beam deflecting galvano-mirror 5, a beam splitter 6, a half-wavelength plate 7, a total reflection prism 8, a polarizing beam splitter 9, a beam splitter 10, a condensing lens 11, a cylindrical lens 12, and a photoelectric detector 13. The movable head portion also includes a grating 14, a beam shaping prism 15 for forming a circular cross-section light beam, a collimator lens 16, a semiconductor laser 17, a focusing device 30, and a tracking device 31.

The fixed head portion 2 includes condensing lenses 18 and 19 and PIN photodiodes 20 and 21.

Operation of the apparatus shown in FIG. 1 will now be described. Linearly polarized output light of the semiconductor laser 17 is collimated by the collimator lens 16 and shaped into a circular cross-section beam by the beam shaping prism 15, after which the light is divided by the grating 14 into three beams forming a minute angle with one another by the diffraction and interference action of the grating. These three beams pass through the beam splitter 10 and then have their optical paths changed by the beam splitter 6 and the galvano-mirror 5, forming a light beam spot on the recording surface of disc 3 with the aid of the objective 4.

Light reflected by the recording surface of the disc 3 again passes through the objective 4 and has its optical path changed by the galvano-mirror 5. It is then divided into a transmitted light beam and a reflected light beam by the beam splitter 6. The reflected light beam is in turn divided into a transmitted light beam and a reflected light beam by the beam splitter 10, and the reflected light bear enters the photoelectric detector 13 through the condensing lens 11 and the cylindrical lens 12. Light transmitted through the beam splitter 10 is fed back to the semiconductor laser 17.

Figure 1A:
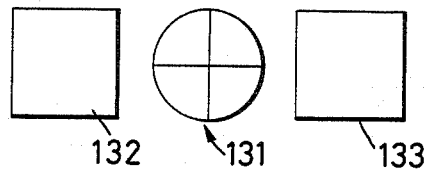
FIG. 1A is a diagram illustrating a photoelectric detector used in the first embodiment.

As shown in FIG. 1A, the photoelectric detector 13 includes a four-division light-receiving element 131 and light-receiving elements 132 and 133 disposed at opposite sides of the four-division light-receiving element. The photoelectric detector is designed to output a focusing error signal in accordance with the output of the four-division light-receiving element 131, which rceives the central one of the three light beams referred to earlier, and to output a tracking error signal in accordance with the outputs of the light-receiving elements 132 and 133, which receive the other two beams. Photoelectric detectors of this type are known in the art.

Focusing device 30 drives the objective 4 along its optical axis in accordance with the focusing error signal to effect focusing. Tracking device 31 rotates the galvano-mirror 5 in accordance with the tracking error signal and moves the light beams on the disc 3 to effect tracking control.

The direction of vibration of the linearly polarized light reflected from disc 3 and transmitted through beam splitter 6 is rotated in a well-known manner (for example, by 45°) by the half-wavelength plate 7 and enters the polarizing beam splitter 9. Light beam 24 transmitted through the polarizing beam splitter 9 is condensed on the PIN photodiode 21 by the condensing lens 19. Light beam 25 reflected by the polarizing beam splitter 9 and redirected by the total reflection prism 8 is condensed on the PIN photodiode 20 by the condensing lens 18. The outputs of the PIN photodiodes 20 and 21 are amplified by pre-amplifiers, not shown, and a reproducing signal is obtained from the difference between the amplified outputs of the preamplifiers.

Light beams 24 and 25 are parallel to each other and to a radius of the disc 3, so that movement of the movable head portion 1 radially of the disc, as indicated by arrow R, will not affect the reproducing signal despite the change in spacing between the movable head portion 1 and the fixed head portion 2. Moreover, unlike the situation with the apparatus of the aforesaid Japanese patent application, even if the planes of polarization of the light beams 24 and 25 are rotated by movement of the movable head portion 1 relative to the fixed head portion 2 in directions other than the radial direction, due to inaccuracy of the slider mechanism of the movable head portion, the reproducing signal will not be affected. This is because such movement does not vary the intensity of the light, and the information carried by the light beams 24 and 25 corresponds to the intensities of the light beams. Thus the detection accuracy will not be affected unless the quantity of light received by the PIN photodiodes 20 and 21 varies.

In the aforesaid Japanese patent application, movement of the movable head portion relative to the fixed head portion in directions other than the radial direction causes rotation of the plane of polarization of the light entering the analyzer in the fixed head portion, and since the intensity of the light emitted by the analyzer changes with rotation of the plane of polarization, the light incident on the light-receiving element that follows the analyzer varies in intensity, causing a reproduction error.

Accordingly, in the present invention a high-accuracy slider mechanism for the movable head portion, required in the apparatus of the Japanese patent application to avoid the reproduction error, is unnecessary. The present invention can be applied to the reproducing head of a recording-reproducing apparatus for a so-called record once optical disc or for a read only optical disc.

Instead of using the half-wavelength plate 7, the polarizing beam splitter 9 and the total reflection prism 8 may be rotated together about the optical axis of the light beam 24. Also, it is possible to use any of various actuators, such as a two-dimensional driving actuator, for driving the objective 4 in two directions.

Figure 2:
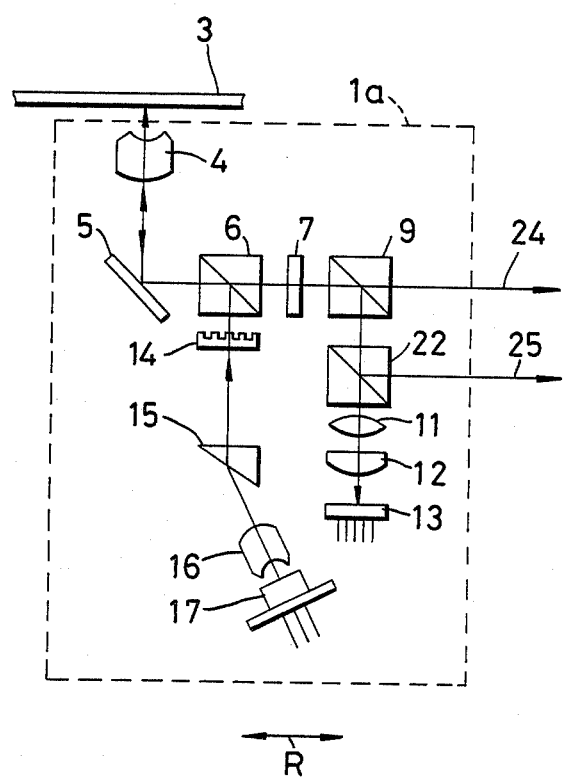
FIG. 2 is a schematic diagram showing a second embodiment of the invention.

FIG. 2 shows a second embodiment of the invention, which employs a different optical system in the movable head portion 1. The fixed head portion 2 in the second embodiment is similar to that in the first embodiment and is therefore not shown in FIG. 2. In the embodiment of FIG. 2 the total reflection prism 8 of the first embodiment is replaced by a beam splitter 22, and the input to the photoelectric detector 13 is light transmitted through the beam splitter 22.

The invention claimed is:

1. A reproducing apparatus for reproducing a signal recorded on a magneto-optical disc, comprising:
    a first head portion;
    a fixed second head portion;
    said first head portion being movable in one direction relative to said disc and relative to said second head portion;
    means disposed on said first head portion for producing a linearly polarized light beam;
    an optical system disposed on said first head portion for directing said light beam to said magneto-optical disc;
    optical means disposed on said first head portion for dividing light reflected by said magneto-optical disc into two components having different planes of polarization and for directing said two components to said second head portion;
    first light intensity detecting means disposed on said second head portion for detecting the intensity of light of one of said two components; and
    said light intensity detecting means disposed on said second head portion for detecting the intensity of light of the other of said two components.

2. An apparatus according to claim 1, wherein said optical means directs said two components to said second head portion along paths that are substantially parallel to said one direction of movement of said first head portion.

3. An apparatus according to claim 2, wherein the direction of movement of said first head portion is substantially radial to said magneto-optical disc.

4. An apparatus according to claim 3, wherein said optical system includes an objective and has focusing means disposed on said first head portion for moving said objective along the optical axis thereof in response to light reflected from said disc.

5. A apparatus according to claim 4, wherein said focusing means includes means for detecting light reflected from sad disc and producing a detection signal, and means for moving said objective in response to said detection signal.

6. An apparatus according to claim 5, wherein said optical system further comprises tracking means disposed on said first head portion and responsive to light reflected from said disc for moving said light beam on said disc.

7. An apparatus according to claim 6, wherein said first light intensity detecting means includes a first photoelectric converting element and means for condensing said one of said two components on said first photoelectric converting element, and said second light intensity detecting means includes a second photoelectric converting element and means for condensing said other of said two compoents on said second photoelectric converting element.

8. A reproducing apparatus for reproducing a signal recorded on a magneto-optical disc, comprising:
    a first head portion;
    a fixed second head portion;
    said first head portion being movable in one direction relative to said disc and relative to said second head portion;
    means disposed on said first head portion for producing a linearly polarized light beam;
    an optical system disposed on said first head portion for directing said light beam to said magneto-optical disc;
    optical means disposed on said first head portion for extracting a component having a predetermined plane of polarization from light reflected from said magneto-optical disc and for directing said extracted component to said second head portion; and
    means disposed on said second head portion for detecting the intensity of light of said component extracted by said optical means.

9. An apparatus according to claim 8, wherein said optical means directs said extracted component to said second head portion along a path that is substantially parallel to said one direction of movement of said first head portion.

10. An apparatus according to claim 9, wherein said one direction of movement of said first head portion is substantially radial to said magneto-optical disc.

* * * * *